United States Patent Office 3,420,708
Patented Jan. 7, 1969

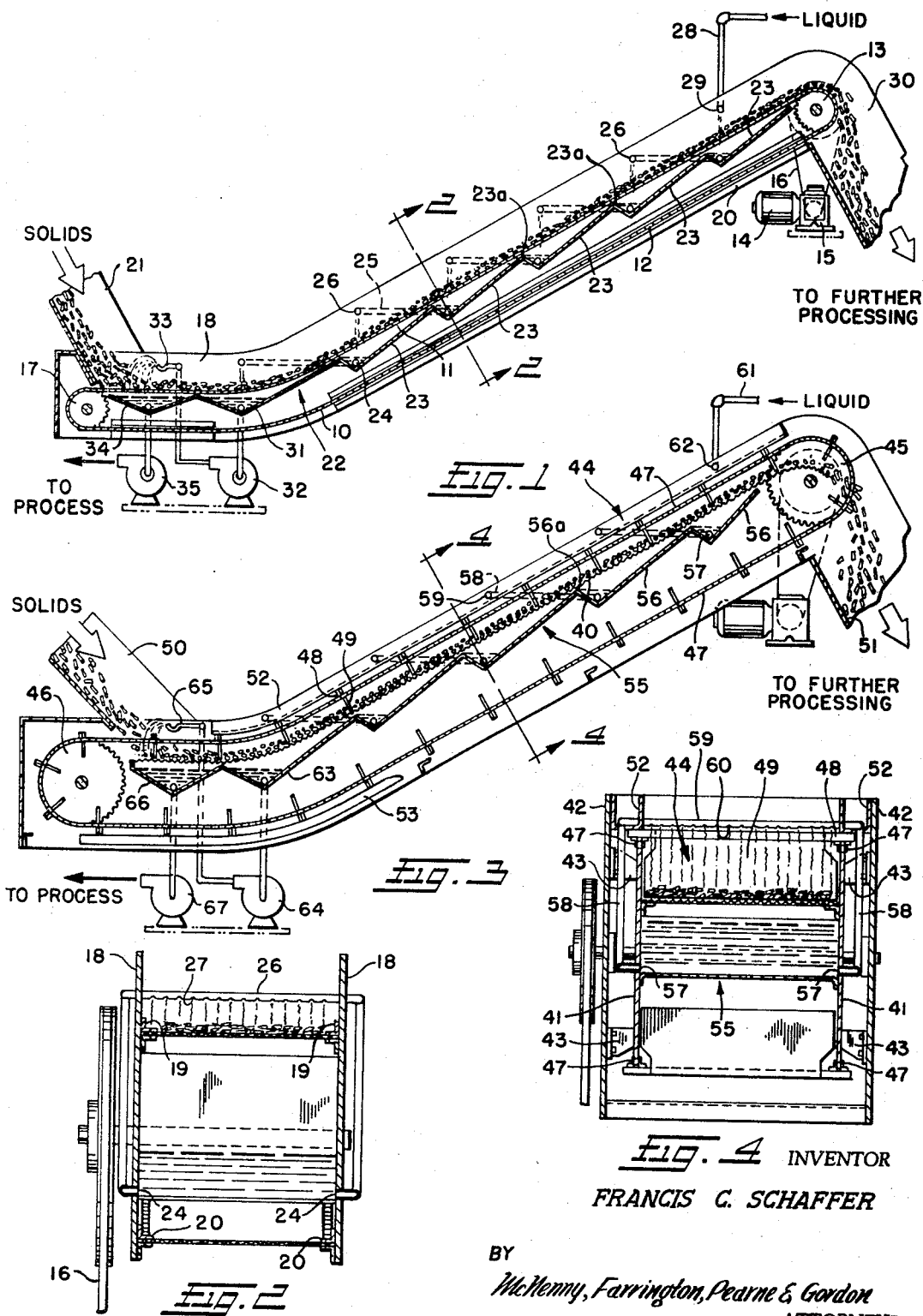

---

3,420,708
INCLINED DIFFUSER
Francis C. Schaffer, 6755 Merrydale,
Baton Rouge, La. 70812
Filed Sept. 27, 1965, Ser. No. 490,563
U.S. Cl. 127—5    3 Claims
Int. Cl. C13d 1/12

This invention relates to apparatus for contacting solids or semisolids with fluids. More particularly, this invention relates to improved apparatus for such purposes as washing, leaching or diffusing extractable substances from the solids or semisolids by moving a liquid and the solids or semisolids in countercurrent relationship.

Although it is to be understood that the apparatus according to this invention may be employed to extract substances from a variety of solids or semisolids, the invention is particularly applicable to diffusion processes for extracting sugar from sugar cane or from sugar beets and for extracting solubles from materials of plant origin.

In the extraction of sugar from sugar beets by diffusion, it is customary to employ a diffusion battery process wherein the cossettes or beet slices are placed in a plurality of large cylindrical vessels. Fresh hot water is introduced into the top of the first vessel so that the water flows through the cossettes to extract some of the sugar from the cells of the beets in that vessel. The sugar enriched water is then piped from the bottom of the first vessel, through a heater, and into the top of the second vessel where the sugar solution again contacts the cossettes. The water is pumped in this manner through the battery of vessels on a continuous basis so that, by the time it reaches the last vessel, it has a high sugar concentration that approximates the original sugar content of the beet. In time, the sugar content of the beets in the first vessel is substantially depleted and the beet pulp is removed from that vessel and the vessel is again charged with fresh beets.

Although the battery diffusion process has been successfully employed for the extraction of sugar from sugar beets, the process and other similar diffusion processes have not been totally successful in the processing of sugar cane. The processing of sugar cane is usually done by extracting the juice by a squeezing or a crushing operation which employs large rolls. One reason for the lack of acceptance of diffusion processes for extracting sugar from sugar cane may be attributed to the fact that the battery diffusion process is not a continuous flow operation since it must be interrupted for the spent pulp to be removed from each vessel. Moreover, cut sugar cane must be processed quickly after it is harvested to prevent deterioration of the sucrose to dextrose and levulose, and a sugar cane battery diffusion plant would require a number of diffusion batteries. Also, since the water is pumped continuously from one vessel to another, any interruption in the supply of sugar cane to the battery may result in a weak sugar solution.

The apparatus according to the present invention is simple in construction and operation. Yet it establishes a desired countercurrent flow between solid or semisolid materials on the one hand and a liquid on the other hand, and provides for relative movement between these materials so that there is a continuous flow of materials through the apparatus. The apparatus according to this invention, furthermore, eliminates the need for supplying solid or semisolid raw materials in relatively large batches to the diffusion process but is capable of processing solid or semisolid raw materials such as cut sugar cane on a continuous basis and, at a rate that favorably corresponds to the consumption rate of cane crushing or squeezing mills.

Accordingly, it is an object of the invention to provide an improved and simple form of apparatus for moving and diffusing particulate solid and/or semisolid materials countercurrently to a liquid extracting medium.

More specifically, it is an object of the invention to provide apparatus for moving particulate solid or semisolid materials upwardly along an inclined path in combination with means for repeatedly passing an extracting or diffusion promoting liquid through the solid or semisolid material and collecting the liquid for a succeeding pass through a different portion of the moving solid or semisolid material, said means including a gravity feed or gravity assisted feed of the liquid over most or all of its travel from the top to the bottom of the path of solid or semisolid material.

Other objects and features of the invention and its attendant advantages will be readily appreciated as the same become better understood by reference to the following detailed description when considered in connection with the accompanying drawings, wherein:

FIG. 1 is a longitudinal, cross-sectional, elevational view of an inclined diffuser according to one aspect of the invention;

FIG. 2 is a cross-sectional view, the plane of the section being indicated by the line 2—2 in FIG. 1;

FIG. 3 is a longitudinal, cross-sectional, elevational view of an inclined diffuser according to a further aspect of this invention; and FIG. 4 is a cross-sectional view, the plane of the section being indicated by the line 4—4 in FIG. 3.

Referring now to the drawings in detail, and particularly to FIGS. 1 and 2, the illustrated apparatus comprises a continuous, foraminous conveyor 10 which is inclined and which has an upwardly moving material conveying reach 11 and a downwardly moving return reach 12. The conveyor 10 may comprise a flexible, non-corroding, wire mesh screen, overlapping perforated plates, perforated belt, or other means of moving the material that will allow the liquid to pass through the moving screen, plates, or belt.

The conveyor 10 is driven at its upper end by a pair of sprocket wheels 13, which in turn are driven by a variable or fixed speed motor 14 through a reduction gear 15 and a belt 16. The lower end of the conveyor 10 is trained around a pair of idler sprocket wheels 17 (only one of which is shown).

The sprocket wheels 13 and 17 are mounted on shafts which extend between a pair of parallel mounting plates 18. Each mounting plate 18 is provided with upper and lower guideways 19 and 20, respectively, which guide the edges of the conveyor 12 along a short horizontal path at the lower end of the conveyor and then along a relatively long upward path toward the sprocket wheels 13.

Solid or semisolid material, such as sugar cane, is introduced into the apparatus at its lower end through a delivery chute 21. If sugar cane is to be processed in the apparatus, the cane is reduced in size. It can be cut into small discs the diameter of the cane and from 1/16 to 1 inch in length. Alternatively, it can be shreaded, milled, crushed, or otherwise reduced in size so that a relatively large surface area is presented and so that most of the sucrose containing cells in the cane are close to an exposed surface.

There is provided a stepped bottom wall 22 between the plates 18 which forms a series of wells or reservoirs 23 along and beneath the inclined extent of the upper reach 11 of the conveyor 10. Each well 23 has an upper edge 23a defining an overflow for that well. Outlet openings 24 are provided at the bottom of each well and extend through the plate 18. Each outlet opening 24 is connected to a side distributor tube 25, which in turn is connected to a distributing means such as a transverse manifold 26 having outlet openings 27 along its longitudinal extent. Liquid, such as hot water if sugar cane is being processed, is introduced through a delivery pipe 28 and is distributed by a distributing means such as a manifold 29 positioned over the topmost reservoir 23.

If sugar cane is being processed, the hot water flows from the manifold 29, drenches the sugar cane, passes through the upper reach 11 of the foraminous conveyor 10, and is collected in the topmost reservoir 23. From the topmost reservoir 23, and, similarly, from each succeeding reservoir along the inclined reach of the conveyor 10, the hot water flows through the outlet openings 24, the distributing tubes 25, and each manifold 26 to each succeeding lower reservoir 23. The hot water is thereby caused to repeatedly drench the cut sugar cane as the cane travels upwardly along the conveyor 10, and the hot water flows in a countercurrent relationship downwardly and repeatedly through the sugar cane by gravity or assisted by gravity.

Since the flow of liquid from well to well is by gravity, each manifold 26 of each conduit 25 is located below a horizontal plane passing thorugh the outlet opening 24 to which the conduit of that manifold is connected, and is preferably located between a horizontal plane passing through the outlet opening 24 to which the conduit of that manifold is connected and a horizontal plane passing through the overflow opening of the well to which that conduit is connected. The flow of liquid from the delivery pipe is regulated so that the level of liquid in each well remains substantially constant and just below the upper edge 23a which defines the overflow for that well. The term "overflow" is therefore intended merely to indicate the edge over which liquid would flow but for the regulated flow of liquid through the apparatus.

As the hot water progresses downwardly along the incline, it becomes progressively enriched with sugar, and the cut sugar cane, as it progresses upwardly, becomes progressively depleted in sugar. The depleted cane or bagasse is conveyed by a gravity chute 30 which is connected to the upper end of the apparatus. The bagasse may be further processed or may be used as a fuel after further dewatering.

The enriched sugar solution is collected in a first trough 31 below the short horizontal portion of the upper reach 11, and from the lowermost point of the trough 31, the solution is conveyed by a pump 32 to a fountain 33 which is located just above and showers the incoming sugar cane. The sugar solution flows from the fountain 33 through the cane and the foraminous conveyor 10 and into a second trough 34. The sugar solution is then pumped from the bottom of the trough 34 by a pump 35 for further processing.

Referring now to FIGS. 3 and 4, an apparatus according to a further aspect of this invention is illustrated. This apparatus comprises a stationary, foraminous, inclined bed 40, which may be a non-corroding wire mesh screen, perforated plates, or similar fixed foraminous surface. The bed 40 is mounted between a pair of parallel mounting plates 41. The mounting plates 41 are, in turn, fixed to a spaced pair of supporting plates 42 by mounting brackets 43.

A double strand roller chain, flight conveyor 44 is mounted between a pair of drive sprockets 45 and a pair of idler sprockets 46 (only one of which is shown). The conveyor 44 includes a pair of continuous roller chains 47, a multiplicity of flight supports 48 fixed to the roller chain 47, and a conveyor flight 49 fixed to each support 48. Each roller chain 47 has its upper and lower reaches riding along the opposite upper and lower side edges of one of the support plates 41. The flights 49 of the conveyor 44 move solids such as cut sugar cane upwardly by pushing them along the foraminous bed 40 from a feed chute 50 to a discharge chute 51. The conveyor 44 is guided along a relatively short, horizontal portion of the bed 40 and then along a relatively long, inclined portion thereof by the support 41 and by a pair of channel members 52. The return reach of the conveyor 44 is guided by a pair of optional guide members 53. The double strand chain is used for purpose of illustration, but it is obvious that more or fewer strands can be used, depending on the size of the apparatus.

There is provided a stepped bottom wall 55 between the plates 41 which forms a series of wells or reservoirs 56 along and beneath the inclined extent of the bed 40. Each well 56 has an upper edge 56a defining an overflow for that well. Outlet openings 57 are provided at the bottom of each well and extend through the plates 41. Each outlet opening 57 is connected to a side distributor tube 58 which, in turn, extends through the channel member 52 and is connected to a distributing means such as a transverse manifold 59, which also extends through the member 52 and is provided with outlet openings 60. Liquid, such as hot water if sugar cane is being processed, is introduced through a delivery pipe 61 and is distributed by a distributing means such as a manifold 62 positioned over the topmost reservoir 56.

If sugar cane is being processed, the hot water flows from the manifold 62, drenching the sugar cane, passes through the foraminous bed 40, and is collected in the topmost reservoir 56. From the topmost reservoir and, similarly, from each succeeing reservoir along the inclined portion of the bed 40, the hot water flows through the outlet openings 57, the distributor tubes 58, and each manifold 59 to each succeeding lower reservoir 56. The hot water is thereby caused to repeatedly drench the cut sugar cane as the cane travels upwardly along the bed 40, and the hot water flows in a countercurrent relationship downwardly and repeatedly through the sugar cane by gravity.

Since the flow of liquid from well to well is by gravity, each manifold 59 of each conduit 58 is located below a horizontal plane passing through the outlet opening 57 to which the conduit of that manifold is connected, and is preferably located between a horizontal plane passing through the outlet opening 57 to which the conduit of that manifold is connected and a horizontal plane passing through the overflow opening of the well to which that conduit is connected. The flow of liquid from the delivery pipe is regulated so that the level of liquid in each well remains substantially constant and just below the upper edge 56a which defines the overflow for that well. The term "overflow" is therefore intended merely to indicate the edge over which liquid would flow but for the regulated flow of liquid through the apparatus.

As the hot water progresses downwardly along the incline, it becomes progressively enriched with sugar, and the cut sugar cane as it progresses upwardly becomes depleted in sugar. The depleted cane or bagasse is conveyed by the gravity chute 51 to a location where it may be further processed into fuel or wall board.

The enriched sugar solution is collected in a first trough 63 located below a short, horizontal portion of the bed 40 and from the lowermost point of the trough 63, the solution is conveyed by a pump 64 to a fountain 65 which is located just above and showers the incoming sugar cane. The sugar solution flows from the fountain 65 through the cane and the foraminous bed 40 and into a second trough 66. The sugar solution is then pumped from the bottom of the trough 66 by a pump 67 for further processing.

The foregoing description of the invention should make it apparent that the invention may be embodied in many different forms, and that the above examples are far from exhaustive. The invention, therefore, is not restricted to the slavish imitation of each and every feature described above, but it is defined by the following claims.

What is claimed is:

1. Apparatus for moving solid and semisolid materials in countercurrent relationship with a liquid and for repeatedly contacting the materials with the liquid, comprising inclined conveyor means for moving solid and semisolid materials upwardly along an inclined path, said conveyor means including a foraminous, path-defining bottom support for said materials, an inclined stationary bottom wall beneath the foraminous support, said wall defining a multiplicity of open-top, fluid-receiving walls along the inclined extent of said path, each of said wells having an upper edge defining an overflow for that well and each of said wells having an outlet opening beneath its upper edge, conduit means having an inlet connected to each outlet opening and having an outlet positioned directly over the foraminous support and over the next lower well on said path, the outlet opening of each of said conduits being positioned below a horizontal plane passing through the overflow opening of the well to which that conduit is connected, whereby liquid that is introduced into an upper well will be conveyed by gravity through the conduit means, through the solid and semisolid materials, through the foraminous support, and into the next lower well on said path.

2. Apparatus according to claim 1 wherein said foraminous support is movable and wherein means are included for moving said support upwardly.

3. Apparatus according to claim 1 wherein said foraminous support is stationary and wherein upwardly driven flights move said solid and semisolid materials along said stationary foraminous support.

References Cited

UNITED STATES PATENTS

| 2,581,175 | 1/1952 | De La Calle | 127—5 |
| 3,275,476 | 9/1966 | Tantawi et al. | 127—5 |

FOREIGN PATENTS

| 494,902 | 3/1930 | Germany. |

MORRIS O. WOLK, *Primary Examiner.*

D. G. CONLIN, *Assistant Examiner.*

U.S. Cl. X.R.

127—43, 45; 23—270; 127—3